United States Patent [19]

Feng et al.

[11] 4,202,866
[45] May 13, 1980

[54] PRODUCTION OF STABLE VANADIUM TETRACHLORIDE

[75] Inventors: Henry H. Feng, Ardsley; John P. D'Acierno, Ossining; Adam E. Skrzec, West Nyack, all of N.Y.

[73] Assignee: Stauffer Chemical Company, Westport, Conn.

[21] Appl. No.: 909,159

[22] Filed: May 24, 1978

[51] Int. Cl.² ............................................. C01G 31/00
[52] U.S. Cl. ..................................... 423/265; 423/492
[58] Field of Search ................................ 423/265, 492

[56] References Cited

U.S. PATENT DOCUMENTS

| | | |
|---|---|---|
| 1,779,856 | 10/1930 | Saklatwalla . |
| 3,128,150 | 4/1964 | Brothers ............................. 423/492 |
| 3,384,448 | 5/1968 | Mason et al. |
| 3,494,728 | 2/1970 | Letson et al. ......................... 423/492 |
| 3,755,547 | 8/1973 | Langenhoff et al. ................ 423/492 |

FOREIGN PATENT DOCUMENTS 207227 2/1968 U.S.S.R. ................................... 423/492

Primary Examiner—Herbert T. Carter
Attorney, Agent, or Firm—William C. Gerstenzang

[57] ABSTRACT

The stability of vanadium tetrachloride is improved by the addition of phosphorus trichloride such as phosphorus trichloride. Preferably, the vanadium tetrachloride is provided by the reductive chlorination of vanadium oxychloride in the presence of activated carbon having a sulfur content less than 1% by weight.

8 Claims, 1 Drawing Figure

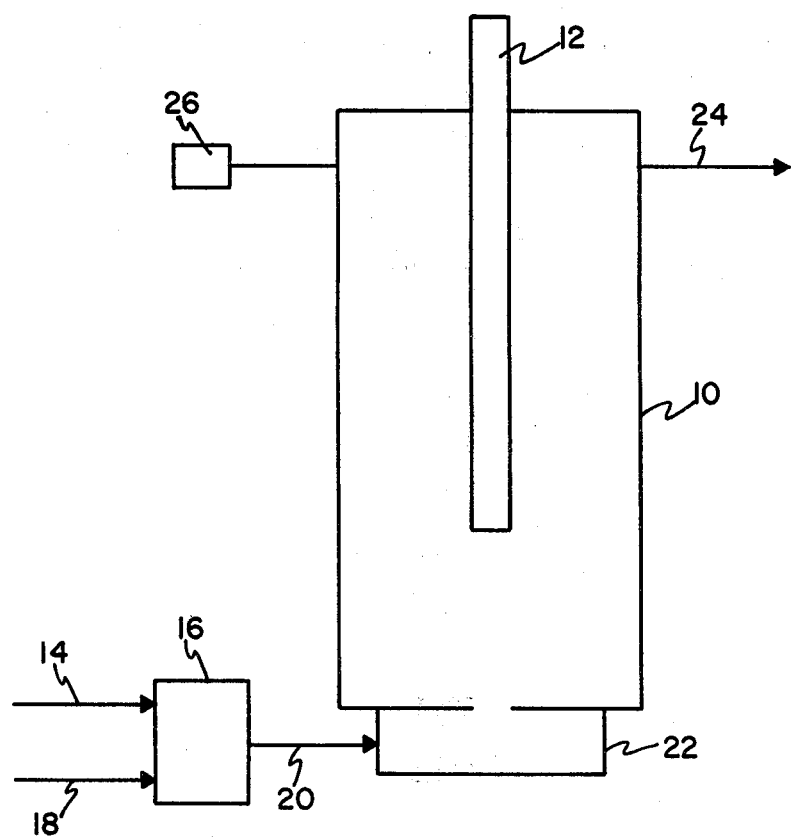

4,202,866

PRODUCTION OF STABLE VANADIUM TETRACHLORIDE

BACKGROUND OF THE INVENTION

This invention relates to the production of stable vanadium tetrachloride. More particularly, this invention relates to the use of phosphorous trichloride to increase the shelf life of vanadium tetrachloride.

Vanadium tetrachloride is a well-known compound useful in industry as a catalyst to produce polyolefins such as polypropylene; synthetic rubbers; etc. It is also used as an intermediate for the preparation of vanadium trichloride, vanadium dichloride and organovanadium compounds.

Various processes for producing vanadium tetrachloride have been described in the prior art. Thus Chem. Abst. 64: 13727h (1965); and Chem Abst. 83: 45404q (1975) both describe the preparation of vanadium tetrachloride by chlorination of its oxytrichloride. U.S. Pat. No. 3,128,150 discloses that the conversion of vanadium oxytrichloride to vanadium chloride by chlorination in a carbon bed can be improved by preconditioning the carbon by heating to at least 200° C. and passing chlorine through the carbon until the off-gas from the carbon is essentially chlorine.

The chlorination of vanadium containing materials to recover vanadium and vanadium chlorides has also been described. Thus, U.S. Pat. No. 1,779,856 discloses chlorination of an aqueous pulp of vanadium containing ores to solubilize the vanadium, thus producing a mixture of vanadium salts including vanadium oxychlorides, vanadium oxides, vanadium sulphate or vanadium chloride. The chlorination of crude residues to recover vanadium is described in U.S. Pat. No. 3,384,448; the process involves pre-treatment of the residue with an organic solvent. U.S. Pat. No. 3,775,547 describes the chlorination of vanadium oxides in the presence of carbon to provide vanadium chlorides and/or oxychlorides in a tube reactor lined with a specific heat-hardened product produced from corundum and a binder. A particular apparatus for producing vanadium chlorides from vanadium oxides is described in U.S. Pat. No. 3,895,097.

Vanadium tetrachloride has also been produced by the reaction of vanadium oxytrichloride with aromatic compounds containing a trichloromethyl group while introducing elemental chlorine into the reaction mixture; this procedure is described in U.S. Pat. No. 3,494,728.

However, regardless of the method of preparation, vanadium tetrachloride is known to be unstable, decomposing slowing to vanadium trichloride and chlorine at temperatures below 63° C.

SUMMARY OF THE INVENTION

Now it has been found in accordance with this invention that vanadium tetrachloride can be stabilized by incorporating therein an effective amount of phosphorous trichloride.

It has also been found that extremely stable vanadium tetrachloride is produced when the phosphorous trichloride is added to a vanadium tetrachloride prepared by chlorinating vanadium oxytrichloride over carbon having a low-sulfur content.

The invention will be better understood by reference to the following description and the accompanying drawing.

BRIEF DESCRIPTION OF THE DRAWING

The FIGURE is a diagrammatic representation of a method in accordance with this invention.

DETAILED DESCRIPTION OF THE INVENTION

More in detail, the preferred phosphorous trichloride employed in the stabilization of vanadium tetrachloride according to this invention is phosphorous trichloride.

The phosphorous trichloride is added to the vanadium tetrachloride in an effective amount to preclude decomposition into vanadium trichloride and chlorine. Generally, amounts between about 10 and 1,000 parts per million (ppm) by weight are employed, with 100 to 500 ppm preferred. The incorporation of the phosphorous trichoride into the vanadium tetrachloride is carried out using a blanketing gas. Any appropriate gas, such as chlorine, or the inert gases such as argon, nitrogen, etc. can be employed.

The vanadium tetrachloride stabilized in accordance with this invention can be prepared by any appropriate method. However, it is preferred to chlorinate vanadium oxychloride in the presence of an absorptive material. In this reaction, temperatures between about 350° and about 800° C., and preferably between about 350° and about 650° C. are employed. A short residence time is used in order to minimize decomposition of the vanadium tetrachloride into vanadium chloride and chlorine prior to stabilization with the phosphorous trichloride.

As an absorptive catalyst is used a material having a large surface area, in the order of about 1 to about 1,000 square meters per gram. Suitable catalysts include activated carbons, various charcoals, etc. It has been found that activated carbons contain sulfur compounds which tend to catalyze the decomposition of vanadium tetrachloride. Thus, it is preferred to utilize the active carbons having a low sulfur content, i.e. a sulfur content less than 1% by weight.

The reaction is carried out in the gaseous phase in any appropriate apparatus. The vanadium tetrachloride can be recovered after one pass through the absorptive catalyst, or a continuous process wherein off-gases are recirculated can be provided. In a continuous process, the bed of absorptive material will become depleted due to its consumption in the reaction as the vanadium tetrachloride is continuously fed through the bed. Thus, fresh absorptive material is then added to the bed and the reaction is continued. Typical apparatus suitable for use in preparing vanadium tetrachloride by this process include static-bed reactors and fluid bed reactors.

Referring to the FIGURE, 10 represents an electrothermal fluid-bed reactor containing an absorptive catalyst. Reactor 10 is heated by graphite electrode 12, which is powered by a transformer (not shown). Chlorine is fed through line 14 into vaporizer 16 and the $VOCl_3$ is fed into vaporizer 16 through line 18. The vaporized mixture is then fed through line 20, which is an electrically traced pipe, into the reactor windbox 22 where it is maintained at a temperature from about 200° to about 250° C., prior to being fed into reactor 10. Windbox 22 is used to equalize the gas pressure in reactor 10. A reaction temperature from about 350° to about 800° C. is maintained in the reactor. After passing through reactor 10, product gases leave through line 24 and are condensed to provide the desired $VCl_4$. A caustic scrubber can be employed to trap uncondensible by-products. Any absorptive catalyst that may be lost by reaction and elutriation can be replenished through access port 26.

The following examples will serve to further illustrate the practice of this invention.

EXAMPLE 1

A. Preparation of $VCl_4$

A fluid-bed reactor as illustrated diagrammatically in the Figure was employed. The reactor 10 consisted of a 6.67 cm graphite tube, 68.6 cm. long, having an expanded section of 12.7 cm., Type 310 stainless steel pipe, 50.8 cm. long, connected to the top to serve as a disengaging section. Toward the top of the disengaging section, at its side, a 1.9 cm. coupling was used as access port 26 to make up the bed material that might be lost by elutriation and chemical reaction. Directly opposite the access port, a 1.9 cm. coupling served as the reaction products gas outlet 24.

Flanged to the bottom of the reactor was windbox 22, and sandwiched in between the bottom flange and the windbox was a 0.16 cm. thick stainless steel distributor plate with nine 0.24 cm. holes on triangular centers. Above the distributor plate, approximately 15.2 cm. of 0.32 cm. silica grog was used to protect the distributor plate from the elevated bed temperatures.

Entering through the top reactor flange (Type 310 stainless steel) is a 1.27 cm. diameter graphite electrode 12, carefully located to run through the center line of the reactor. Electrical power is connected to the central electrode from a Westinghouse transformer. Single phase, 60 cycle, alternating current was used in these examples.

The reactants were fed in amounts to provide a 36 mole percent excess of $Cl_2$. $VOCl_3$ was contained in a reservoir made from 10.2 cm. glass pipe with a capacity of 7.6 liters. The vaporized feed was transmitted to the reactor windbox 22 through an electrically traced pipe and, to prevent condensation, the windbox was also electrically traced and the gas temperature maintained at 240° C. The feed rate of $VOCl_3$ was metered by a direct reading rotameter. The vaporization rate was maintained constant by adjusting power to the resistance heating elements so that a constant level was maintained in the vaporizer. Measured amounts of activated carbons were added periodically to make up for losses by elutriation and reaction.

Reactor product gases leaving the reactor through line 24 passed through a cyclone and entered the glass vertical condenser. The reactor outlet line 24 and cyclone were wound with an electric heating tape to prevent condensation. The product condenser was a standard glass condenser with an estimated 0.28 square meters of condensing surface. For high condensation efficiency, carbon tetrachloride was used as a coolant, fed to the condenser at −5° C. The carbon tetrachloride in turn exchanged with a "Blue M" constant Flow Portable Cooling Unit, set at −19° C. This cooling unit is manufactured by the Blue M. Electric Co., Blue Island, Ill.

The gases leaving the condenser were passed through a cold trap to remove uncondensed $VCl_4$ and $VOCl_3$ and then scrubbed with caustic solution to remove unreacted chlorine.

BPL carbon, to which 10% by weight graphite was added, was used as the absorptive material in reactor 10. The BPL carbon was obtained from Calgon Corp., Pittsburgh, Pa. Analysis indicated that it contained 0.8% by weight sulfur. An initial bed height of 44.5 cm. was used. The reaction conditions and the condensate analysis were as follows:

| Reactor temperature, 650°–730° C. | |
|---|---|
| Feed rates, grams/minute | |
| $VOCl_3$ | 33.4 |
| $Cl_2$ | 9.3 |
| Average residence time, seconds | 5.0 |
| Production rate (condensate), grams/minute | 37.5 |
| Condensate analysis, weight % | |
| $VCL_4$ | 98.4 |
| $VOCl_3$ | 1.4 |
| $Cl_2$ | 0.9 |

B. Addition of Phosphorous Trichloride Stabilizer

Five samples of the $VCl_4$ obtained in Part A were taken; two were used as controls while varying amounts of $PCl_3$ in parts per million (ppm) were added to the remaining samples. The samples were maintained under a blanketing gas throughout the procedure. Stability was initially determined by observing a pressure increase to about 30 psig in the sample bottles which indicated decomposition of the $VCl_4$, evolving chlorine gas. The degree of decomposition was determined by analyzing samples periodically withdrawn from the sample bottle. The results are given below. After 8½ months the stability test was terminated and the sample destroyed.

| SAMPLE | BLANKETING GAS | $PCl_3$ (ppm) | STABILITY |
|---|---|---|---|
| 1 | Argon | 0 | 7–9 days |
| 2 | Chlorine | 0 | 9–11 days |
| 3 | Chlorine | 50 | 9–10 days |
| 4 | Chlorine | 500 | 8 months |
| 5 | Chlorine | 5000 | >8¼ months |

EXAMPLE 2

A. Preparation of $VCl_4$.

The apparatus and procedure described in Example 1 were employed with the exception that a 78 mole percent excess of $Cl_2$ was charged and PCB Carbon containing 15% by weight graphite was used as the absorptive material. PCB carbon, which was analyzed as containing 0.15% total sulfur, was obtained from Calgon Corp., Pittsburgh, Pa. The bed height was 50.8 cm. at the beginning of the reaction and 36.2 cm. at the end; no additional activated carbon was added during the reaction. The reaction conditions and the condensate analysis were as follows:

| Reactor temperature, 660°–750° C. | |
|---|---|
| Feed rates, grams/minute | |
| $VOCl_3$ | 33.3 |
| $Cl_2$ | 12.1 |
| Average residence time, seconds | 4.0 |
| Production rate (condensate), grams/minute | 40.1 |
| Condensate Analysis, weight % | |
| $VCl_4$ | 98.9 |
| $VOCl_3$ | 0.5 |

-continued

| | |
|---|---|
| Cl$_2$ | 2.9 |

B. Addition of Phosphorus Trichloride Stabilizer

Four samples of the VCl$_4$ obtained in part A were taken and stability data obtained as described in Example 1 using PCl$_3$ as the phosphorus trichloride stabilizer. The resutls are set forth below.

| SAMPLE | BLANKETING GAS | PCl$_3$ (ppm) | STABILITY |
|---|---|---|---|
| 1 | Argon | 0 | 22–24 days |
| 2 | Chlorine | 0 | 22–24 days |
| 3 | Chlorine | 50 | 4.5 months |
| 4 | Chlorine | 500 | >8.5 months |

EXAMPLE 3

Example 2 was repeated with the exception that a 44 mole percent excess of Cl$_2$ was charged, a bed height of 35.6 to 38.1 cm. was maintained by carbon addition during the run, and the reaction conditions were changed to those specified below; the condensate analysis is also given.

| | |
|---|---|
| Reactor temperature, 690°–790° C. | |
| Feed rates, grams/minute | |
| VOCl$_3$ | 24.4 |
| Cl$_2$ | 7.2 |
| Average residence time, seconds | 5.0 |
| Production rate (condensate), grams/minute | 28.3 |
| Condensate Analysis, weight % | |
| VCl$_4$ | 97.3 |
| VOCl$_3$ | 1.1 |
| Cl$_2$ | 2.9 |

B. Addition of Phosphorus Trichloride Stabilizer

PCl$_3$ was added to three samples of the VCl$_4$ obtained in Part A; chlorine was used to blanket all samples. The stability of the samples, determined as described in Example 1, is given below. The poorer stability for Sample 3 was attributed to experimental error.

| SAMPLE | PCl$_3$ (ppm) | STABILITY |
|---|---|---|
| 1 | 100 | 7 months |
| 2 | 500 | >8.5 months |
| 3 | 5000 | 7 months |

EXAMPLE 4

A. Prepartion of VCl$_4$

The apparatus and procedure described in Example 1 were employed with the exception that a 79 mole percent excess of Cl$_2$ was charged and Witco Carbon Type 235 containing 10% by weight graphite was used as the absorptive material. Witco Carbon 234, which was analyzed as containing 3.0% total sulfur, was obtained from Witco Chemical Corp., New York, N.Y. The bed height was 45.1 cm. at the beginning of the reaction and 31.4 cm. at the end; batches of additional activated carbon were added during the reaction. The reaction conditions and the condensate analysis were as follows:

| | |
|---|---|
| Reactor temperature, 650°–730° C. | |
| Feed rates, grams/minute | |
| VOCl$_3$ | 33.0 |
| Cl$_2$ | 12.1 |
| Average residence time, seconds | 3.5 |
| Production rate (condensate), grams/minute | 38.8 |
| Condensate analysis, weight % | |
| VCl$_4$ | 98.0 |
| VOCl$_3$ | 1.0 |
| Cl$_2$ | 1.0 |

B. Addition of Phosphorus Trichloride Stabilizer

Five samples of the VCl$_4$ obtained in Part A were taken and stability data obtained as described in Example 1 using PCl$_3$ as the phosphorus trichloride stabilizer. The results are set forth below.

| SAMPLE | BLANKETING GAS | PCl$_3$ (ppm) | STABILITY |
|---|---|---|---|
| 1 | Nitrogen | 0 | 1–2 days |
| 2 | Chlorine | 0 | 1–2 days |
| 3 | Chlorine | 50 | 2–3 days |
| 4 | Chlorine | 500 | 2–3 days |
| 5 | Chlorine | 5000 | 3–5 days |

What is claimed is:

1. A method of stabilizing vanadium tetrachloride against decomposition into vanadium trichloride and chlorine which comprises incorporating therein an amount of phosphorus trichloride effective to preclude said decomposition.

2. The method of claim 1 wherein between about 10 and about 1,000 parts per million by weight of said phosphorus trichloride is employed.

3. The method of claim 1 wherein said vanadium tetrachloride is obtained by chlorinating vanadium oxchloride in the presence of activated carbon.

4. The method of claim 3 wherein said activated carbon has a sulfur content less than about 1% by weight.

5. A stabilized vanadium tetrachloride composition comprising vanadium tetrachloride and an amount of phosphorus trichloride effective to preclude decomposition of said vanadium tetrachloride into vanadium trichloride and chlorine.

6. The stabilized vanadium tetrachloride composition of claim 5 wherein said phosphorus trichloride is present in an amount between about 10 and about 1,000 parts per million by weight.

7. The stabilized vanadium tetrachloride of claim 6 wherein the vanadium tetrachloride is obtained by chlorinating vanadium oxychloride in the presence of activated carbon.

8. The stabilized vanadium tetrachloride of claim 7 wherein said activated carbon has a sulfur less than about 1% by weight.

* * * * *

UNITED STATES PATENT AND TRADEMARK OFFICE
CERTIFICATE OF CORRECTION

PATENT NO. : 4,202,866
DATED : May 13, 1980
INVENTOR(S) : Henry H. Feng, John P. D'Acierno and Adam E. Skrze It is certified that error appears in the above-identified patent and that said Letters Patent are hereby corrected as shown below:

In the Abstract - first sentence, the term "such as phosphorus trichloride" should be deleted.

In the Specification

Col. 1, line 49 - "U. S. Patent No. 3,775,547" should be -- U. S. Patent No. 3,755,547 --.

Signed and Sealed this

Twenty-second Day of July 1980

[SEAL]

Attest:

SIDNEY A. DIAMOND

Attesting Officer    Commissioner of Patents and Trademark